United States Patent
Breitkreutz et al.

(10) Patent No.: US 11,201,925 B2
(45) Date of Patent: Dec. 14, 2021

(54) COMMUNICATING PARAMETERS BASED ON A CHANGE

(71) Applicant: Caterpillar Inc., Peoria, IL (US)

(72) Inventors: Travis O. Breitkreutz, Mapleton, IL (US); Mustafizur Rahman, Peoria, IL (US); Viswanadha Koppolu, Dunlap, IL (US); Robert E. Shockency, Jr., Creve Coeur, IL (US); Sridhar Reddy Janumpally, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/860,889

(22) Filed: Apr. 28, 2020

(65) Prior Publication Data

US 2021/0337029 A1    Oct. 28, 2021

(51) Int. Cl.
*H04L 29/08*    (2006.01)
*H04W 28/02*    (2009.01)
*H04L 29/06*    (2006.01)

(52) U.S. Cl.
CPC .......... *H04L 67/14* (2013.01); *H04L 65/1006* (2013.01); *H04L 69/16* (2013.01); *H04W 28/0278* (2013.01)

(58) Field of Classification Search
CPC ....... H04L 67/02; H04L 67/14; H04L 67/145; H04L 67/42; H04L 69/16; H04L 69/24; H04L 47/741; H04L 47/826; H04L 65/1006; G06F 11/34; H04W 28/0278
See application file for complete search history.

(56) References Cited

U.S. PATENT DOCUMENTS

| | | | |
|---|---|---|---|
| 6,725,281 B1 * | 4/2004 | Zintel | H04L 12/2803 709/217 |
| 7,546,119 B2 | 6/2009 | Ham | |
| 10,334,052 B2 | 6/2019 | Breitkreutz | |
| 2005/0238034 A1 | 10/2005 | Gillespie et al. | |
| 2006/0007934 A1 | 1/2006 | Chemiakina et al. | |
| 2006/0154605 A1 | 7/2006 | Ham | |
| 2011/0040824 A1 | 2/2011 | Harm | |
| 2018/0060759 A1 * | 3/2018 | Chu | G06N 20/00 |
| 2018/0124185 A1 * | 5/2018 | Breitkreutz | H04L 67/141 |

(Continued)

FOREIGN PATENT DOCUMENTS

| | | |
|---|---|---|
| CN | 105681446 A | 6/2016 |
| CN | 104486379 B | 1/2019 |

*Primary Examiner* — Mohamed A. Wasel
*Assistant Examiner* — Rachel J Hackenberg
(74) *Attorney, Agent, or Firm* — Harrity & Harrity LLP (57) ABSTRACT

A client device may identify a first parameter that is to be updated periodically and a second parameter that is to be updated based on a state change. The client may transmit, via a negotiation session, a request to the server device. The request indicates that the server device is to periodically provide information indicating a current value of the first parameter and is to provide information indicating an updated value of the second parameter when a state of the second parameter changes. The client device may periodically receive, from the server device and via a second communication protocol, a first datagram including the current value of the first parameter and may receive a second datagram including the updated value of the second parameter based on the server device determining that the current state of the second parameter has changed.

20 Claims, 5 Drawing Sheets

(56) References Cited

U.S. PATENT DOCUMENTS

2019/0199589 A1\* 6/2019 Le ...................... H04L 41/0816
2019/0199804 A1   6/2019 Pathak et al.
2020/0092957 A1\* 3/2020 Ma .......................... H05B 6/50

\* cited by examiner

COMMUNICATING PARAMETERS BASED ON A CHANGE

TECHNICAL FIELD

The present disclosure relates generally to a system and method for communicating parameters and, for example, to a system and method for communicating a parameter based on a change.

BACKGROUND

Machines such as, for example, wheel loaders, motor graders, planers, and other types of machinery are used to perform a variety of tasks associated with an industry such as, mining, construction, manufacturing, transportation, and/or another type of industry. To perform these tasks, a machine may include a plurality of systems. Each system may include a controller, such as an electronic control module (ECM). The ECMs may form a network and may be in communication with each other via one or more data links.

A particular function performed by the machine may involve several ECMs. ECMs on machines may be consumers of a great number of different parameters. The parameters may be requested by an ECM in order to determine control commands for performing various operational aspects of the machine's functions and may be obtained from one or more producers of the relevant data. The producers of the relevant data may provide updated parameter values to the ECM on a periodic basis regardless of whether a parameter value has changed. However, for some parameters, the ECM may only need the parameters to be updated as soon as the value of the parameter changes; such parameters, for example, may include configurable options from menu screens that a machine operator may infrequently change, or states of hardware switches that an operator may occasionally press. For such parameters, the ECM may need to receive and act upon their changed values within 250 ms or less to provide what appears to the operator to be an immediate response. For a typical machine system such as a planer, there may be tens or hundreds of such parameters, each of whose values may only change once or perhaps a few times within an eight-hour shift. Communicating such parameters periodically may require hundreds of thousands of messages in an eight-hour shift, while communicating them only when they change may require a small fraction of that, thereby saving both communication bandwidth and processing time on the ECM.

One attempt to change an operation parameter of a communication terminal is disclosed in U.S. Pat. No. 7,546,119 that issued to Young-Cheol Ham on Jun. 9, 2009 ("the '119 patent"). In particular, the '119 patent discloses a method for changing an operation parameter of a communication terminal that includes recognizing that an operation parameter in a database includes a new upgraded parameter, searching for at least one communication terminal needing to be upgraded to the new parameter, and performing an upgrade procedure for the at least one communication terminal to provide the new parameter.

While the method for changing an operation parameter of a communication terminal of the '119 patent may be effective for improving an upgrade procedure, the '119 patent does not disclose systems and methods for conserving computing resources utilized to process periodic updates of parameters that only need to be updated when a value of the parameter changes.

The systems and methods of the present disclosure solves one or more of the problems set forth above and/or other problems in the art.

SUMMARY

According to some implementations, a method may include determining, by a parameter categorization component of a client device, a group of parameters associated with controlling an operation associated with the client device; determining, by the parameter categorization component, that a first parameter, of the group of parameters, to be updated periodically; determining, by the parameter categorization component, that a second parameter, of the group of parameters, is to be updated based on a state change associated with the second parameter; utilizing, by a message generation component of the client device, a protocol buffer message to define a body of a first request for establishing a parameter negotiation session; transmitting, by a parameter negotiation session component of the client device, the first request to a server device via a first communication protocol; establishing, by the parameter negotiation session component, the parameter negotiation session based on the first request; transmitting, by the parameter negotiation session component via the parameter negotiation session, a second request to the server device via the first communication protocol, wherein the second request indicates that the server device is to provide a periodic notification of a value of the first parameter and a conditional notification of a value of the second parameter when the second parameter changes from a current state to a new state, and wherein the client device utilizes the protocol buffer to format a body of the second request; periodically receiving, by the client device, from the server device, and via a second communication protocol, a first datagram including a current value of the first parameter; receiving, by the client device, from the server device, and via the second communication protocol, a second datagram including the value of the second parameter based on the server device determining that a state associated with the second parameter has changed from the current state to the new state; and utilizing, by the client device, the current value of the first parameter and the value of the second parameter to control the operation associated with the client device.

According to some implementations, a device may receive, from a client device, a first request for establishing a parameter negotiation session, wherein the first request is received via a first communication protocol, and wherein a body of the first request is defined utilizing a protocol buffer message; establish the parameter negotiation session based on the first request; receive, via the first communication protocol, a second request from the client device, wherein the second request indicates that the device is to periodically provide information indicating a value of a first parameter and that the device is to provide information indicating an updated value of a second parameter when a current value of the second parameter changes, and wherein a body of the second request is defined utilizing the protocol buffer; periodically transmit, to the client device and via a second communication protocol, a first datagram including information indicating an updated value of the first parameter; determine that the current value of the second parameter has changed; and transmit, to the client device and via the second communication protocol, a second datagram including information indicating the updated value of the second parameter based on the current value of the second parameter changing.

According to some implementations, a system may include a client device configured to: identify a first parameter that is to be updated periodically; identify a second parameter that is to be updated based on a state change associated with the second parameter; transmit a first request for establishing a parameter negotiation session to a server device via a first communication protocol, wherein a body of the first request is defined utilizing a protocol buffer message, and wherein the parameter negotiation session is established based on the first request; transmit, via the parameter negotiation session and using the first communication protocol, a second request to the server device, wherein the second request indicates that the server device is to periodically provide information indicating a current value of the first parameter and that the server device is to provide information indicating an updated value of the second parameter when a state of the second parameter changes, and wherein the client device utilizes the protocol buffer to format a body of the second request; periodically receive, from the server device and via a second communication protocol, a first datagram including the current value of the first parameter; and receive, from the server device and via the second communication protocol, a second datagram including the updated value of the second parameter based on the server device determining that the state of the second parameter has changed.

DETAILED DESCRIPTION

This disclosure relates to systems and methods for exchanging parameter data used to control and/or monitor an operation of a machine. The term "machine" may refer to any machine that performs an operation associated with an industry such as, for example, mining, construction, farming, transportation, or any other industry. As some examples, the machine may be a vehicle, a backhoe loader, a cold planer, a wheel loader, a compactor, a feller buncher, a forest machine, a forwarder, a harvester, an excavator, an industrial loader, a knuckleboom loader, a material handler, a motor grader, a pipelayer, a road reclaimer, a skid steer loader, a skidder, a telehandler, a tractor, a dozer, a tractor scraper, or other above ground equipment, underground equipment, a marine equipment, and the like.

Figure 1:
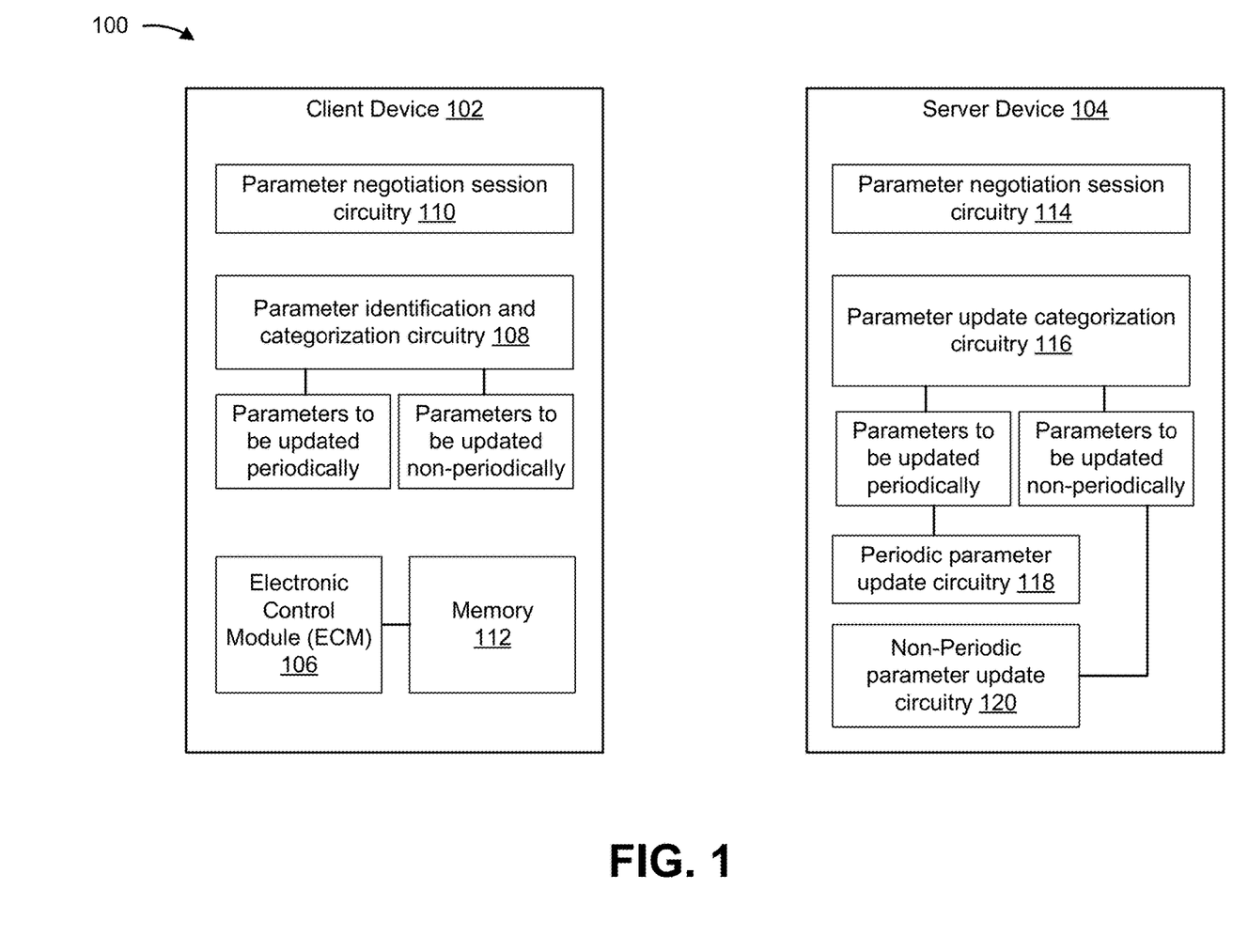
FIG. 1 is a diagram of an example system for negotiating and communicating parameter data for a negotiated group of parameters

FIG. 1 is a diagram of an example system 100 for negotiating and communicating parameter data for a negotiated group of parameters. In some implementations, system 100 enables dynamic negotiation of a group of parameters that will be exchanged, either directly, or indirectly, between a consumer and a producer of parameter data for a negotiated group of parameters. Dynamic negotiation of a group of parameters refers to a negotiation of the group of parameters that will be exchanged between a client device and a server device, without requiring the establishment of a static set of parameters beforehand. In this way, the group of parameters that will be exchanged can be updated or changed based on a current requirement of the client device.

As shown in FIG. 1, system 100 includes a client device 102 and a server device 104. The client device 102 may be a device than consumes (e.g., utilizes) parameter values to perform a function associated with the client device 102. For example, the client device 102 may be a display that consumes configuration parameter values to cause display a user interface. Although implementations described herein indicate the client device 102 as a consumer of parameter data for a group of parameters, alternatively, and/or additionally, the client device 102 may act as an agent for a consumer of the parameter values. For example, the client device 102 may negotiate a group of parameters for a consumer of parameter data for the group of parameters (e.g., a display). The client device 102 may receive parameter data for the negotiated group of parameters and may provide the parameter data to the consumer of the parameter data.

As shown in FIG. 1, the client device 102 includes an electronic control module (ECM) 106, a parameter identification and categorization (PIC) circuitry 108, a parameter negotiation session (PNS) circuitry 110, and a memory 112.

The ECM 106 includes one or more processors configured to control and/or monitor an operation associated with the client device 102. To control and/or monitor the operation, the ECM 106 utilizes, or consumes, one or more parameters. The parameters may include parameters relating to temperatures, pressures, flow rates, gas consumptions, relative positions of components, operator inputs, signals indicative of activation or deactivation of various actuators and/or valves, a geographic location of the machine, other sensed and/or calculated data associated with an operation of the machine, user settings (e.g., a language in which information is to be displayed, a format for displaying a current date and/or time, and/or the like), and/or other types of parameters.

However, for some parameters, the ECM 106 may only need the parameters to be updated as soon as the value of the parameter changes; such parameters, for example, may include configurable options from menu screens that a machine operator may infrequently change, or states of hardware switches that an operator may occasionally press. For such parameters, the ECM 106 may need to receive and act upon their changed values within 250 ms or less to provide what appears to the operator to be an immediate response. For a typical machine system such as a planer, there may be tens or hundreds of such parameters, each of whose values may only change once or perhaps a few times within an eight-hour shift. Communicating such parameters periodically may require hundreds of thousands of messages in an eight-hour shift, while communicating them only when they change may require a small fraction of that, thereby saving both communication bandwidth and processing time on the ECM 106.

The PIC circuitry 108 is configured to identify a set of parameters utilized by the client device 102. For example, the PIC circuitry 108 may analyze configuration data stored in memory 112. The PIC circuitry 108 may determine the set of parameters utilized by the client device 102 based on the analysis. The client device 102 may also act as an agent for a consumer of the parameter data (e.g., another client device, another ECM, and/or the like), and the PIC circuitry 108 may determine the set of parameters based on information received from the consumer of the parameter data.

For each parameter, the PIC circuitry 108 determines whether the parameter is a periodic parameter that is to be updated at predetermined time intervals or a non-periodic parameter that is to be updated upon detecting a change in parameter value. A parameter is updated periodically when updates to data associated with the parameter are transmitted and/or received upon the expiration of an update period. A parameter is updated non-periodically when the update is received only when data associated with the parameter changes. The PIC circuitry 108 utilizes machine learning to determine whether updates to data associated with the parameter are to be received periodically or are to be received when the data associated with the parameter changes as described elsewhere herein.

In some embodiments, the PIC circuitry 108 determines whether a parameter is a periodic parameter or a non-periodic parameter based on a frequency at which a value of the parameter changes. The PIC circuitry 108 may utilize machine learning to determine whether a parameter is a periodic or non-periodic parameter. For example, the PIC circuitry 108 may train a machine learning model based on historical data associated with the parameter to determine whether the parameter is a periodic or non-periodic parameter based on a frequency at which a value of the parameter changes. The parameter may be determined to be a periodic parameter when the frequency at which the value of the parameter changes satisfies a threshold frequency.

The PIC circuitry 108 may determine that a parameter is a non-periodic parameter when a value of the parameter is associated with a state change such as a change from an on state to an off state, a change from a first gear to a second gear, a change from a first user setting of a user interface (e.g., a number of columns to display, a font size, a format for displaying a date, a format for displaying a current time, and/or the like) to a second user setting of the user interface, and/or the like.

The PIC circuitry 108 forms a first group of parameters and a second group of parameters. The first group of parameters includes one or more parameters determined to be periodic parameters. The PIC circuitry 108 generates first parameter information for the first group of parameters. The first parameter information includes information identifying an update period and/or information identifying a first port of the client device 102. The update period corresponds to a frequency at which parameter data for the first group of parameters is to be provided by the server device 104 (e.g., every 0.5 ms, every 1.0 ms, every 1.5 ms, and/or another frequency). The first port is a port of the client device 102 to which parameter data for the first group of parameters is to be transmitted by the server device 104.

The second group of parameters includes one or more parameters determined to be non-periodic parameters. The PIC circuitry 108 determines second parameter information for the second group of parameters. The second information includes information indicating that parameter data for the second group of parameters is not to be provided periodically and/or is to be provided only when a value of the parameter value and/or a state of the parameter changes. In some implementations, the second information may additionally include information identifying a second port of the client device 102. The second port is a port of the client device 102 to which parameter data for the second group of parameters is to be transmitted by the server device 104. The PIC circuitry 108 provides information identifying the first and second groups of parameters and the first and second parameter information to the PNS circuitry 110.

The PNS circuitry 110 is configured to receive the information identifying the first and second groups of parameters and the first and second parameter information from the PIC circuitry 108. The PNS circuitry 110 generates a request message for requesting a negotiation session with the server device 104 based on the information received from the PIC circuitry 108.

The request message includes information identifying a requested session timeout. The requested session timeout indicates an amount of time for which the server device 104 is to provide updated parameter data for a negotiated group of parameters (e.g., the first and second groups of parameters) to the client device 102. The client device 102 can extend the amount of time for which the server device 104 is to provide the updated parameter data by transmitting, prior to the amount of time indicated by the session timeout elapsing, a message to the server device 104 requesting that the session be refreshed (e.g., that a timer associated with the session timeout be reset).

The PNS circuitry 110 transmits the request message to the server device 104 to request, and subsequently establish, a negotiation session with the server device 104. In some embodiments, the PNS circuitry 110 requests and establishes the negotiation session using HyperText Transfer Protocol (HTTP) requests and responses. In other embodiments, the PNS circuitry 110 requests and establishes the negotiation session using Scalable Service-Oriented Middleware over IP (SOME/IP), Common Industrial Protocol (CIP), and/or the like.

The server device 104 includes a device that performs a parameter group transfer with a client (e.g., client device 102), as described herein. The server device 104 and the client device 102 may be included in the same, or different devices and/or associated with the same, or different machines. For example, the server 104 and the client 102 may be implemented with separate ECMs included in a single physical device or may be implemented in two different devices. As shown in FIG. 1, the server device 104 includes a PNS circuitry 114, a parameter update categorization (PUC) circuitry 116, a periodic parameter update (PPU) circuitry 118, and a non-periodic parameter update (NPU) circuitry 120.

The PNS circuitry 114 is configured to receive a request to establish a negotiation session from the PNS circuitry 110 and to establish the requested negotiation session. For example, the PNS circuitry 114 may receive the request message generated by the PNS circuitry 110, as described above. The PNS circuitry 114 determines a set of server supported session timeouts based on the received request. The PNS circuitry 114 selects a server supported session timeout that is closest to the requested session timeout. The PNS circuitry 114 transmits a response message to the PNS circuitry 110 via HTTP or another communication protocol. A body of the response message may include information identifying the server supported session timeout and may use a protocol buffer message as a data format. The PNS 110 receives the response message from the PNS 114 and transmits an acknowledgement to the PNS 114 to establish the negotiation session.

The PNS circuitry 114 establishes the negotiation session with the PNS circuitry 110. The PNS circuitry 110 transmits a message to the PNS circuitry 114 requesting updates to parameter data for the first and second group of parameters. The message may include information identifying the first and second groups of parameters, the first parameter information, and/or the second parameter information.

A body of the request message (protocol buffer message) uses protocol buffers as a data format. The protocol buffer message is a logical record of information, containing a series of one or more fields. Each field includes a name-value pair corresponding to a parameter included in the first or second group of parameters. The name of the name-value pair corresponds to a name, or identifier, of the parameter. The value of the name-value pair is a type of a value associated with the parameter (e.g., integer value, floating-point value, Boolean, string, raw bytes, enumeration, another protocol buffer message, and/or the like). For example, the first group of parameters may include a temperature parameter. The protocol buffer message may include the field "float temperature=1". The value "1" identifies the field as the first field in the protocol buffer message. The value "float" identifies a floating-point value as a value type associated with a parameter having the name "temperature."

The PNS circuitry 114 receives, via HTTP or another communication protocol, the message and determines whether the parameters included in the first and second groups of parameters are supported by the server device 104. For example, for each parameter, the PNS circuitry 114 determines whether an entity updating the parameter data is available to provide updated parameter data. The PNS circuitry 114 provides, via HTTP or another communication protocol, information identifying each parameter supported by the server device 104 to the PNS circuitry 110. The PNS circuitry 110 receives the information identifying each parameter supported by the server device 104 and transmits, via HTTP or another communication protocol, an acknowledgement to the PNS circuitry 114 to complete the parameter negotiation process.

The PNS circuitry 114 receives the acknowledgement from the PNS circuitry 110 and modifies the first group of parameters and/or the second group of parameters by removing any parameters not supported by the server device 104. The removal of unsupported parameters prevents the negotiation session from being terminated based on the server device 104 being unable to support all the requested parameters. In this way, removal of unsupported parameters conserves computing resources that would otherwise be utilized to conduct a new negotiation session. The PNS circuitry 114 provides information identifying the parameters included in the first and second groups of parameters to the PUC circuitry 116.

The PUC circuitry 116 is configured to categorize parameters included in the first group of parameters as periodic parameters and to categorize parameters included in the second group of parameters as non-periodic parameters. In some implementations, the PUC circuitry 116 includes categorization circuitry that categorizes parameters included in the first group of parameters as periodic parameters based on the first parameter information. The categorization circuitry categorizes parameters included in the second group of parameters as periodic parameters based on the second parameter information. The PUC circuitry 116 may utilize machine learning to categorize the parameters, as described elsewhere herein.

The PUC circuitry 116 provides information identifying the first group of parameters as periodic parameters to the PPU circuitry 118 and provides information identifying the second group of parameters as non-periodic parameters to the NPU circuitry 120.

The PPU circuitry 118 is configured to provide periodic updates to parameter data for the first group of parameters. The updated parameter data may be provided to the client device 102 using a message-based connectionless protocol, such as User Datagram Protocol (UDP). The updated parameter data may be included in a UDP message (e.g., a datagram). The data provided in the datagram may be formatted as binary data with a session header and a message body containing the updated parameter data.

The PPU circuitry 118 provides periodic updates for the group of periodic parameters based on the first parameter information. For example, the message received from the client device 102 may include the first parameter information. The PPU circuitry 118 may analyze the first parameter information and determine an update period and/or a port of the client device 102 to which the periodic updates are to be transmitted.

The PPU circuitry 118 provides the periodic updates based on a server supported update period. The PPU circuitry 118 may identify a server supported update period, from the set of server supported update periods, based on the update period identified in the message received from the client device 102.

When the group of server supported update periods includes a server supported update period that is the same as the update period identified in the message received from the client device 102, the PPU circuitry 118 selects the server supported update period. Otherwise, the PPU circuitry 118 selects a server supported update period that is closest to the update period identified in the message received from the client device 102.

The PPU circuitry 118 periodically transmits a datagram including the updated parameter values to the port identified in the message received from the client device 102 based on the update period identified in the message received from the client device 102 or the server supported update period (hereinafter referred to as the "update period").

The client device 102 receives datagram and parses the datagram based on identifiers of the parameters included in the first group of parameters to determine the updated parameter values. The client device 102 stores the updated parameter values in the memory 112.

The NPU circuitry 120 is configured to periodically obtain current parameter values for the non-periodic parameters from a producer of the non-periodic parameter values and to provide the current parameter values to the client device 102. The NPU circuitry 120 periodically obtains updated parameter values for the non-periodic parameters and, for each parameter value, determines whether the updated parameter value is different than the current parameter value. When an updated parameter value is different than the current parameter value, the NPU circuitry 120 generates a UDP message (e.g., a datagram) that includes the updated parameter value and transmits the datagram to the port of the client device 102 identified in the second parameter information. The NPU circuitry 120 stores the updated parameter value as the current parameter value for that parameter and repeats the process using the stored updated parameter value as the current parameter value. When the updated parameter is the same as the current parameter value, the NPU circuitry 120 discards the updated parameter value and does not provide the updated parameter value to the client device 102.

The client device 102 receives the updated parameter value at the port and parses the datagram to determine the updated parameter value. The client device 102 stores the updated parameter value in the memory 112. The ECM 106 retrieves the updated parameter value from the memory 112 and utilizes the updated parameter value, and/or provides the updated parameter value to another device, to control an operation of the machine.

Figure 2:
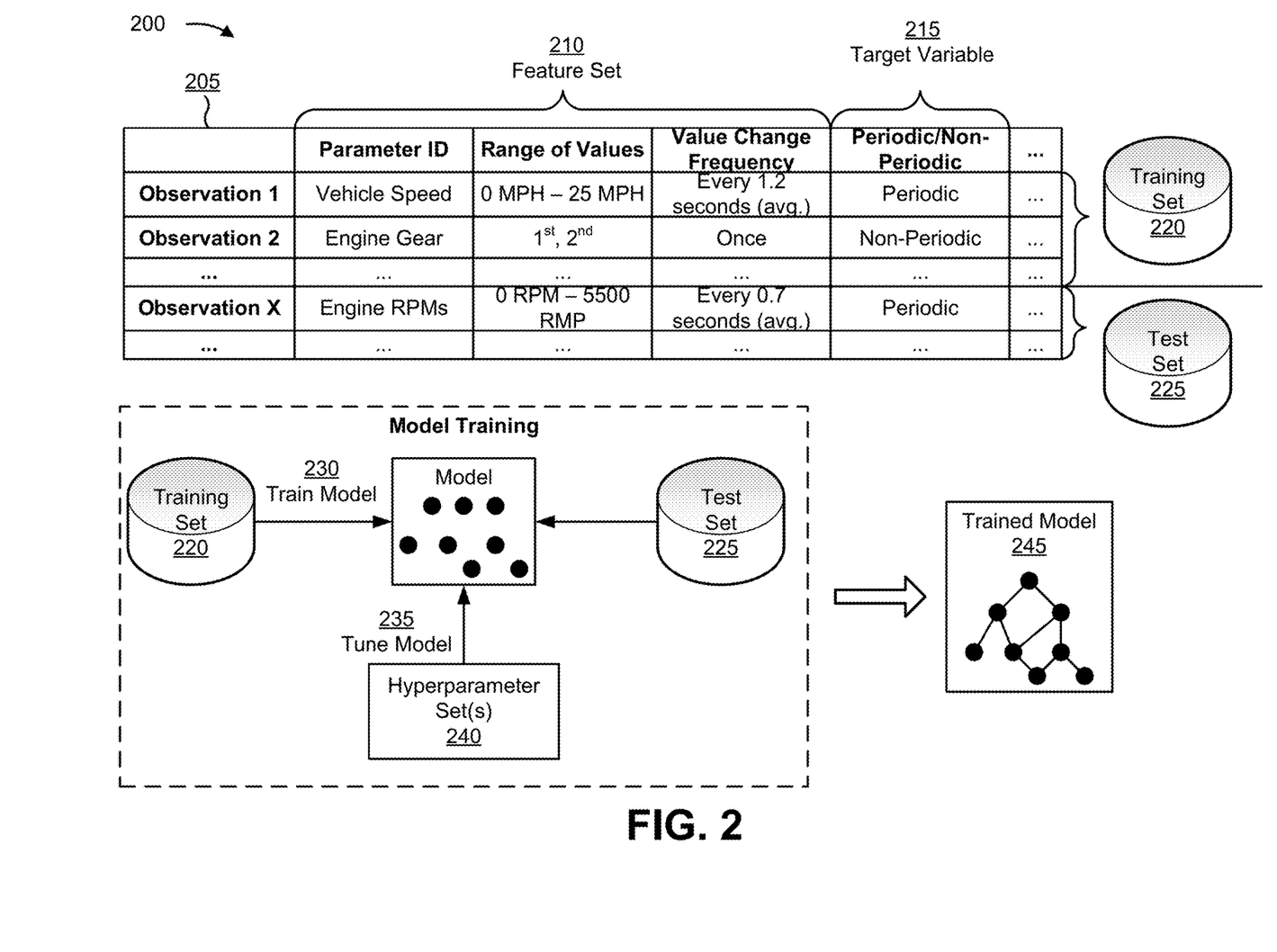
FIG. 2 is a diagram illustrating an example of training a machine learning model.

FIG. 2 is a diagram illustrating an example 200 of training a machine learning model. As shown by reference number 205, a machine learning model is trained using a set of observations. The set of observations are obtained and/or input from historical data, such as, for example, data obtained by the PIC circuitry 108, as described elsewhere herein.

As shown by reference number 210, a feature set is derived from the set of observations. The feature set includes a set of variable types, referred to as features. A specific observation includes a set of variable values corresponding to the set of variable types. A set of variable or feature values are specific to an observation. The machine learning system determines variable values for a specific observation based on input received from the PIC circuitry 108.

As an example, a feature set for a set of observations includes a first feature of Parameter ID (e.g., an identifier associated with a parameter), a second feature of Range of Values (e.g., a range of values that a value of a parameter may fall within), a third feature of Frequency of Value Change (e.g., a frequency at which a value of a parameter changes), and so on, as an example. As shown, for a first observation, the first feature has a value of Vehicle Speed, the second feature has a value of 0 MPH-25 MPH, the third feature has a value of Every 1.2 seconds (avg.), and so on. These features and feature values are provided as examples, and may differ in other examples. For example, the feature set may include a state of a parameter, a value type of a value of a parameter (e.g., an integer value, a floating-point value, a string, and/or the like.

As shown by reference number 215, the set of observations is associated with a target variable type. The target variable type may represent a variable having a numeric value (e.g., an integer value, a floating point value, and/or the like), a variable having a numeric value that falls within a range of values or has some discrete possible values, a variable that is selectable from one of multiple options (e.g., one of multiples classes, classifications, labels, and/or the like), a variable having a Boolean value (e.g., 0 or 1, True or False, Yes or No), and/or the like. A target variable type may be associated with a target variable value that is specific to an observation.

The target variable represents a value that a machine learning model is being trained to predict, and the feature set represents the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

The machine learning model may be an unsupervised training model that is trained on a set of observations that do not include a target variable (or that include a target variable, but the machine learning model is not being executed to predict the target variable). In this case, the machine learning model learns patterns from the set of observations without labeling or supervision, and provides output that indicates such patterns, such as by using clustering and/or association techniques to identify related groups of items within the set of observations.

As further shown, the machine learning system partitions the set of observations into a training set 220 that includes a first subset of observations and a test set 225 that includes a second subset of observations. The training set 220 is used to train (e.g., fit, tune, and/or the like) the machine learning model, while the test set 225 is used to evaluate a machine learning model that is trained using the training set 220. For example, for supervised learning, the training set 220 may be used for initial model training using the first subset of observations, and the test set 225 may be used to test whether the trained model accurately predicts target variables in the second subset of observations.

As shown by reference number 230, the machine learning system trains a machine learning model using the training set 220. This training includes executing, by the machine learning system, a machine learning algorithm to determine a set of model parameters based on the training set 220. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system uses one or more hyperparameter sets 240 to tune the machine learning model. A hyperparameter includes a structural parameter that controls execution of a machine learning algorithm by the machine learning system, such as a constraint (e.g., a weight constraint that checks the size or magnitude of weights used in a neural network and scales the weights so the weights are below a predefined threshold) applied to the machine learning algorithm.

To train a machine learning model, the machine learning system identifies a set of machine learning algorithms to train a machine learning model using the training set 220. The machine learning system tunes each machine learning algorithm using one or more hyperparameter sets 240. The machine learning system may train a particular machine learning model using a specific machine learning algorithm and a corresponding hyperparameter set 240.

The machine learning system then tests this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system stores that machine learning model as a trained machine learning model 245 to be used to analyze new observations, as described below in connection with FIG. 3.

Figure 3:
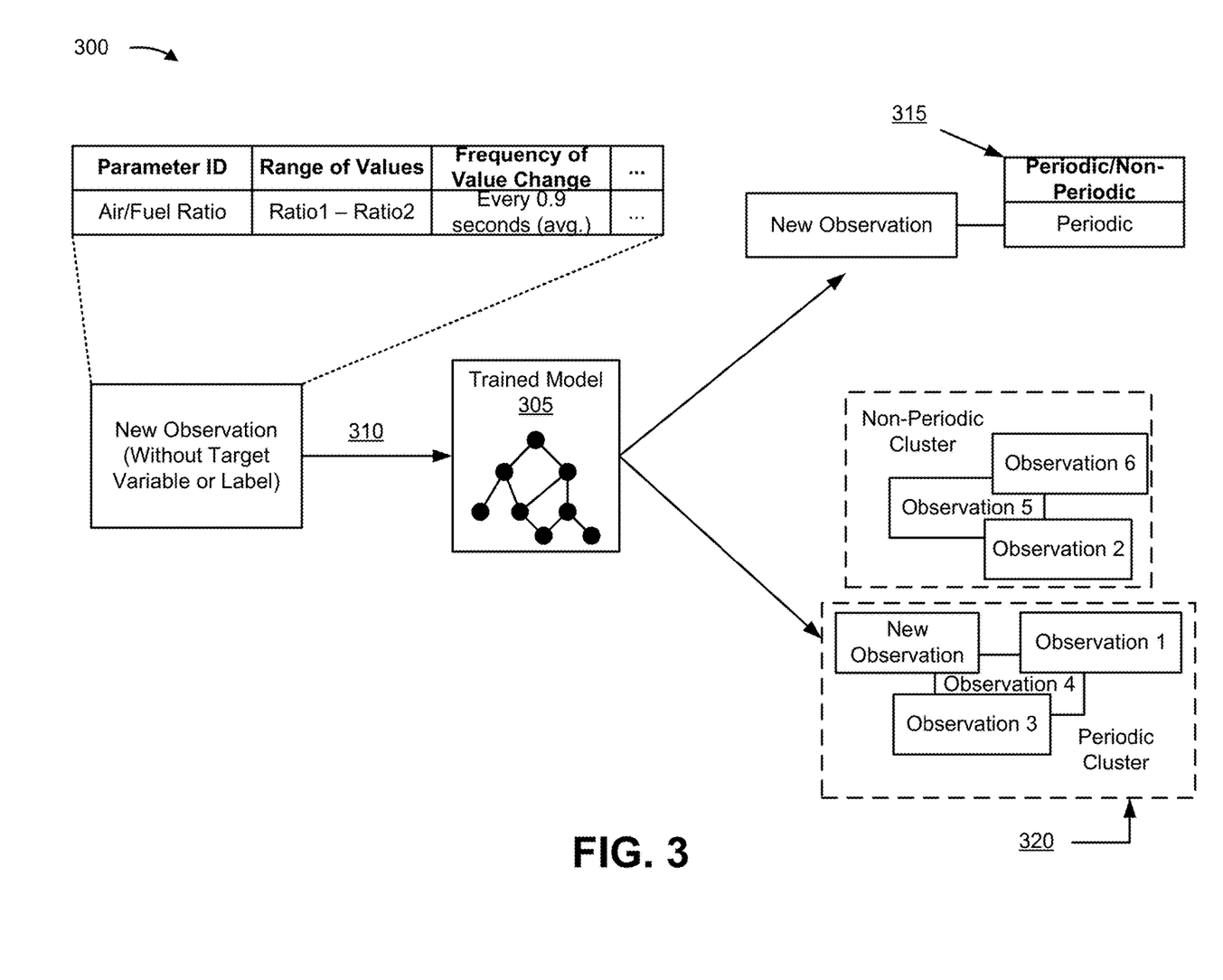
FIG. 3 is a diagram illustrating an example of applying a trained machine learning model to a new observation.

FIG. 3 is a diagram illustrating an example 300 of applying a trained machine learning model to a new observation. The new observation is input to a machine learning system that stores a trained machine learning model 305.

As shown by reference number 310, the machine learning system receives a new observation (or a set of new observations) and inputs the new observation to the machine learning model 305. As shown, the new observation includes a first feature of Parameter ID (e.g., an identifier associated with a parameter), a second feature of Range of Values (e.g., a range of values that a value of a parameter may fall within), a third feature of Frequency of Value Change (e.g., a frequency at which a value of a parameter changes), and so on, as an example. The machine learning system applies the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. The output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

The trained machine learning model 305 predicts a value of Periodic parameter or Non-Periodic parameter for the target variable for the new observation, as shown by reference number 315. The trained machine learning model 305 may classify (e.g., cluster) the periodic parameters of the new observation in a Periodic cluster, as shown by reference number 320.

In this way, the machine learning system may apply a rigorous and automated process to identify and categorize parameters as periodic parameters or non-periodic parameters. The machine learning system enables recognition and/or identification of possibly thousands of features and/or feature values for thousands of observations. Mapping of features, feature values and observations increases an accuracy and consistency of identifying and categorizing parameters, accordingly saving valuable computing resources needed for manually performing thousands of operators to identify and categorize parameters using the features or feature values.

Figure 4:
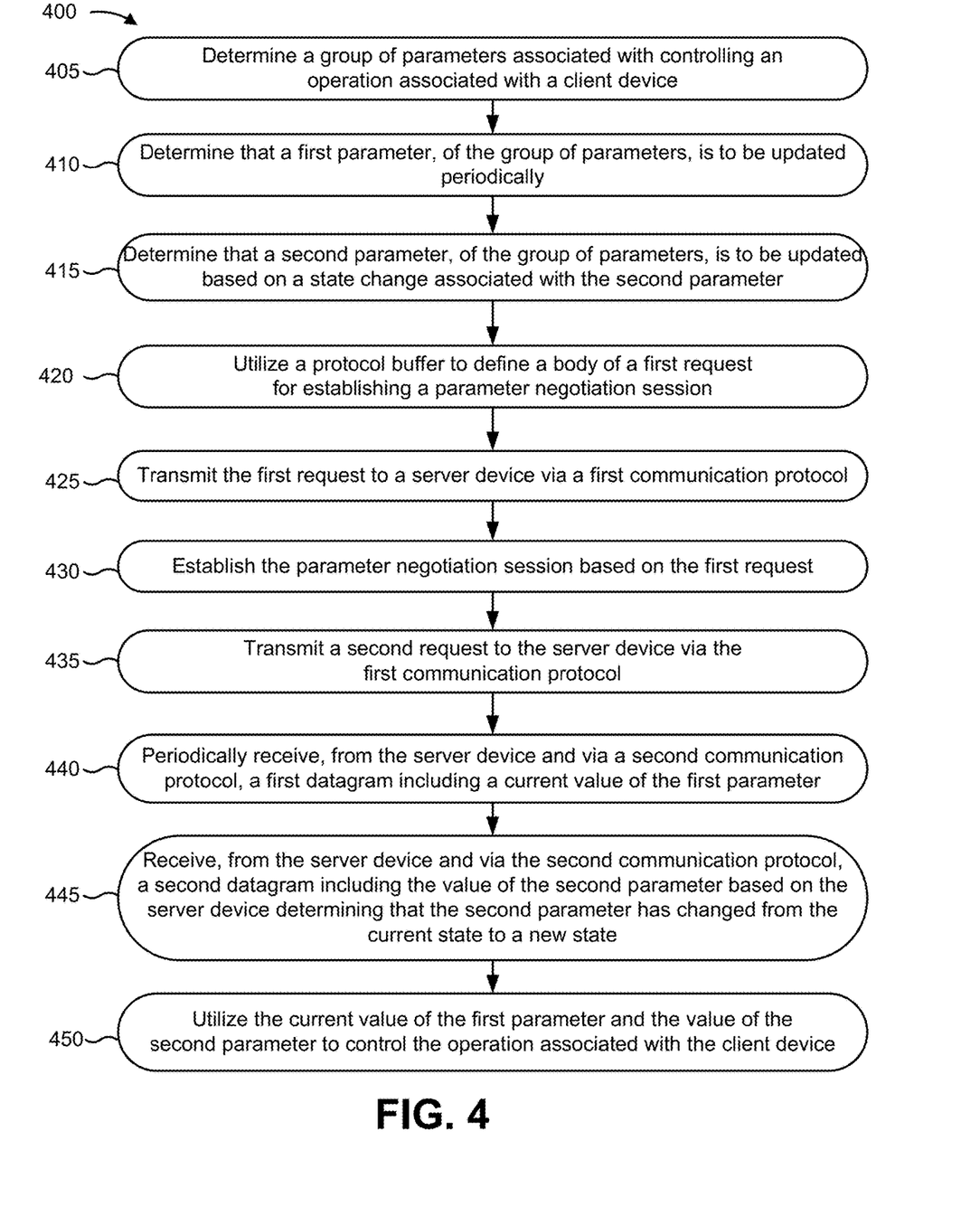
FIG. 4 illustrates a flow chart of an example process for negotiating and receiving parameter data for a negotiated group of parameters.

FIG. 4 is a flow chart of an example process 400 for negotiating and communicating parameter data for a negotiated group of parameters. In some implementations, one or more process blocks of FIG. 4 may be performed by a client device (e.g., client device 102).

As shown in FIG. 4, process 400 may include the client device 102 may at block 405 determining a group of parameters associated with controlling an operation associated with the client device, as described above.

The client device 102 may, at block 410, determine that a first parameter, of the group of parameters, to be updated periodically, as described above.

The client device 102 may, at block 415, determine that a second parameter, of the group of parameters, is to be updated based on a state change associated with the second parameter, as described above. The first and second parameter may be associated with measured or calculated data related to the operation associated with the client device 102.

The client device 102 may, at block 420, utilize a protocol buffer message to define a body of a first request for establishing a parameter negotiation session, as described above. In some implementations, the first request includes information identifying a requested session timeout associated with the parameter negotiation session.

At block 425, the client device 102 may transmit the first request to the server device 104 via a first communication protocol, as described above. In some implementations, the client device 102 may receive, from the server device 104, information indicating a server-supported session timeout that is determined based on the requested session timeout.

At block 430, the client device 102 may establish the parameter negotiation session based on the first request, as described above.

The client device 102 may, at block 420, transmit a second request to the server device via the first communication protocol, as described above. The second request indicates that the server device 104 is to provide a periodic notification of a value of the first parameter and a conditional notification of a value of the second parameter when the second parameter changes from a current state to a new state. The client device 102 utilizes the protocol buffer to format a body of the second request. The client device 102 may receive, from the server device 104, information indicating that the server device 104 is able to support the second request.

At block 440, the client device 102 may periodically receive, from the server device 104 and via a second communication protocol, a first datagram including a current value of the first parameter, as described above.

At block 445, the client device 102 may receive, from the server device 104 and via the second communication protocol, a second datagram including the value of the second parameter based on the server device determining that the state associated with the second parameter has changed from the current state to the new state, as described above.

The second request includes a destination address of the client device 102 and the client device 102 receives the second datagram at the destination address. The second request may also include information identifying a UDP port and the client device 102 may receive the second datagram at the UDP port. The client device 102 may receive, from the server device 104, a third datagram including an updated value of the third parameter based on the server device determining a state change associated with the third parameter.

At block 450, the client device 102 may utilize the current value of the first parameter and the value of the second parameter to control an operation of a machine or a component of a machine, as described above.

Figure 5:
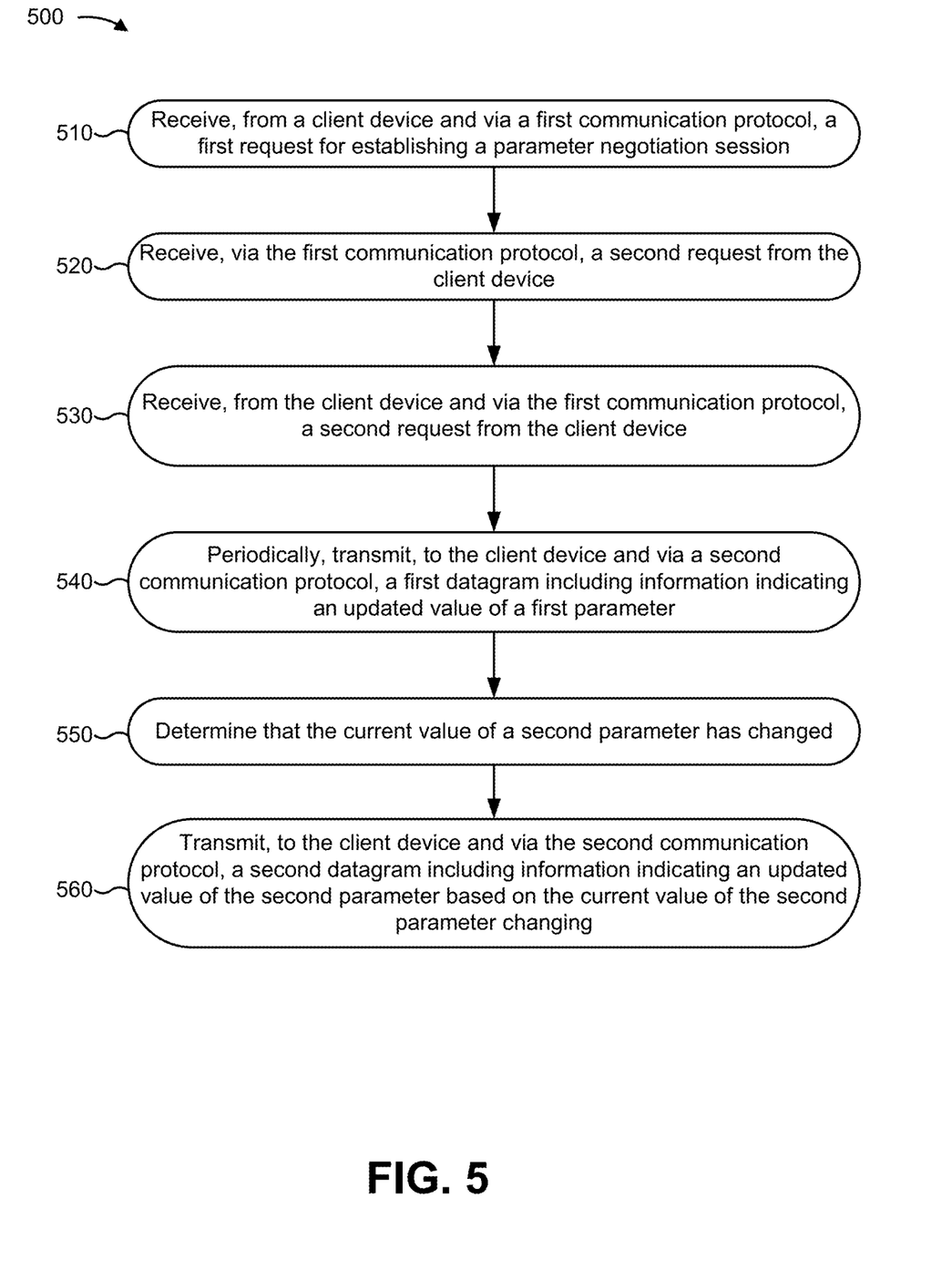
FIG. 5 illustrates a flow chart of an example process for negotiating and communicating parameter data for a negotiated group of parameters.

FIG. 5 is a flow chart of an example process 500 for negotiating and communicating parameter data for a negotiated group of parameters. In some implementations, one or more process blocks of FIG. 5 may be performed by a server device (e.g., server device 104).

As shown in FIG. 5, at block 510, the server device 104 may receive, from a client device 102, a first request for establishing a parameter negotiation session, as described above. The first request is received via a first communication protocol and a body of the first request is defined utilizing a protocol buffer message. The first request includes information indicating a requested session timeout for the parameter negotiation session.

The server device 104 may, at block 520, establish the parameter negotiation session based on the first request, as described above. The server device 104 transmits, to the client device 102 and via the first communication protocol, information indicating that the server device 104 is able to support the parameter negotiating session and the parameter negotiating session is established based on the server device 104 transmitting the information to the client device 102.

At block 530, the server device 104 may receive, via the first communication protocol, a second request from the client device 102, as described above. The second request indicates that the server device 104 is to periodically provide information indicating a value of a first parameter and that the device is to provide information indicating an updated value of a second parameter when a current value of the second parameter changes.

A body of the second request is defined utilizing the protocol buffer. The server device 104 may determine that the first parameter and the second parameter are included in a group of parameters supported by the server device 104 and may transmit information identifying the group of parameters to the client device 102.

The server device 104 may, at block 540, periodically transmit, to the client device 102 and via a second communication protocol, a first datagram including information indicating an updated value of the first parameter, as described above. In some implementations, the server device 104 may periodically transmit the first datagram based on determining that the first parameter is included in the group of parameters supported by the server device 104.

At block 550, the server device 104 may determine that the current value of the second parameter has changed, as described above.

The server device 104 may, at block 560, transmit, to the client device 102 and via the second communication protocol, a second datagram including information indicating the updated value of the second parameter based on the current value of the second parameter changing, as described above. In some implementations, the server device 104 transmits the second datagram further based on determining that the second parameter is included in the group of parameters supported by the server device 104. The second request may include information identifying an UDP port associated with the client device 102 and the server device 104 may transmit the second datagram to the UDP port.

INDUSTRIAL APPLICABILITY

The implementations described herein may provide increased efficiency, adaptability, and reliability in the exchange of parameter data associated with parameters used in controlling and/or monitoring a functioning of a machine and/or a component of a machine.

Machine components such as ECUs and/or other devices that rely on accurate and timely inputs and updates of various forms of sensed data may benefit from the ability of the system 100 to dynamically negotiate exactly what parameters are needed at any particular time. Dynamic negotiation between consumer and a producer of parameter data for a group of parameters may be performed rapidly, spontaneously, and with a minimum of required bandwidth by sending request and response messages between a server associated with the producer and a client associated with the consumer via HTTP.

The use of HTTP also ensures that as a new machine is added to a system, a new machine component is added to a machine, and/or an existing machine or an existing machine component is repaired and/or updated, the disclosed system will provide backward compatibility between a client device and a server device associated with a consumer and a producer of parameter data for a group of parameters.

The request and response messages exchanged via HTTP between the client device and the server device during initial negotiations to determine exactly what parameters will be included in the parameter group transfer may also be structured with protocol buffer messages in the bodies of the request and response messages.

By utilizing protocol buffers messages, a size of the request and response messages can be reduced relative to using extensible markup language (XML). A reduction in the size of the messages can conserve computing resources (e.g., processing resources, memory resources, communication resources, and/or the like). Further, a data structure of the protocol buffer messages can be changed without effecting the compatibility deployed programs or applications that are compiled against the previous format of the data structure. Therefore, costs associated with updating deployed programs or applications based on a change in a format of a data structure can be reduced.

After negotiations have resulted in identification of parameter data for particular parameters to be exchanged in one or more groups of parameters, updated parameter data associated with the negotiated parameters may be sent to the client device using UDP messages, thereby greatly enhancing the efficiency and timeliness of the updates.

By utilizing UDP for data transfer of updated parameter data rather than requiring the establishment of a TCP connection between the client device and the server device, the messages carrying the updated parameter data can be efficiently exchanged using a message-based connectionless protocol that does not require hand-shaking dialogues for guaranteeing reliability, ordering, or data integrity. With UDP, messages (e.g., datagrams) can be transmitted to other devices on an Internet protocol (IP) network without requiring prior communications to set up special transmission channels or data paths. In this way, after dynamic establishment of one or more negotiated groups of parameters to be exchanged between the client device and the server device via HTTP, updates to parameter data for the negotiated parameters can be efficiently and rapidly communicated to the client.

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A method, comprising:
   determining, by a parameter categorization component of a client device, a group of parameters associated with controlling an operation associated with the client device;
   determining, by the parameter categorization component, that a first parameter, of the group of parameters, to be updated periodically;
   determining, by the parameter categorization component, that a second parameter, of the group of parameters, is to be updated based on a state change associated with the second parameter;
   utilizing, by a message generation component of the client device, a protocol buffer message to define a body of a first request for establishing a parameter negotiation session;
   transmitting, by a parameter negotiation session component of the client device, the first request to a server device via a first communication protocol;

establishing, by the parameter negotiation session component, the parameter negotiation session based on the first request;
transmitting, by the parameter negotiation session component via the parameter negotiation session, a second request to the server device via the first communication protocol,
wherein the second request indicates that the server device is to provide a periodic notification of a value of the first parameter and a conditional notification of a value of the second parameter when the second parameter changes from a current state to a new state, and
wherein the client device utilizes the protocol buffer to format a body of the second request;
periodically receiving, by the client device, from the server device, and via a second communication protocol, a first datagram including a current value of the first parameter;
receiving, by the client device, from the server device, and via the second communication protocol, a second datagram including the value of the second parameter based on the server device determining that a state associated with the second parameter has changed from the current state to the new state; and
utilizing, by the client device, the current value of the first parameter and the value of the second parameter to control the operation associated with the client device.

2. The method of claim 1, wherein the first parameter and the second parameter are associated with measured or calculated data related to an operation of a machine.

3. The method of claim 1, wherein the first request includes information identifying a requested session timeout associated with the parameter negotiation session; and
wherein the method further comprises:
receiving, from the server device, information indicating a server-supported session timeout that is determined based on the requested session timeout.

4. The method of claim 1, further comprising:
receiving, from the server device, information indicating that the server device is able to support the second request.

5. The method of claim 1, further comprising:
receiving, from the server device and based on the second request, information identifying a group of parameters, wherein the group of parameters includes the second parameter and a third parameter; and
wherein the method further comprises:
receiving a third datagram including an updated value of the third parameter based on the server device determining a state change associated with the third parameter.

6. The method of claim 1, wherein the second request includes a destination address of the client device; and
wherein receiving the second datagram includes:
receiving the second datagram at the destination address.

7. The method of claim 1, wherein the second request includes information identifying a User Datagram Protocol (UDP) port associated with the client device; and
wherein receiving the second datagram includes:
receiving the second datagram at the UDP port.

8. A device, comprising:
one or more memories; and
one or more processors, communicatively coupled to the one or more memories, to:
receive, from a client device, a first request for establishing a parameter negotiation session,
wherein the first request is received via a first communication protocol, and
wherein a body of the first request is defined utilizing a protocol buffer message;
establish the parameter negotiation session based on the first request;
receive, via the first communication protocol, a second request from the client device,
wherein the second request indicates that the device is to periodically provide information indicating a value of a first parameter and that the device is to provide information indicating an updated value of a second parameter when a current value of the second parameter changes, and
wherein a body of the second request is defined utilizing the protocol buffer;
periodically transmit, to the client device and via a second communication protocol, a first datagram including information indicating an updated value of the first parameter;
determine that the current value of the second parameter has changed; and
transmit, to the client device and via the second communication protocol, a second datagram including information indicating the updated value of the second parameter based on the current value of the second parameter changing.

9. The device of claim 8, wherein the one or more processors are further to:
determine that the second parameter is included in a group of parameters supported by the device,
wherein the second datagram is transmitted to the client device based on the second parameter being included in the group of parameters.

10. The device of claim 8, wherein the second request includes information identifying a User Datagram Protocol (UDP) port associated with the client device, and
wherein the one or more processors, when transmitting the second datagram, are further to:
transmit the second datagram to the UDP port.

11. The device of claim 8, wherein the first request includes information indicating a requested session timeout for the parameter negotiating session.

12. The device of claim 8, wherein the one or more processors are further to:
determine that the second parameter is included in a group of parameters supported by the device; and
transmit information identifying the group of parameters based on the second parameter being included in the group of parameters.

13. The device of claim 8, wherein the one or more processors are further to:
transmit, to the client device and via the first communication protocol, information indicating that the device is able to support the parameter negotiating session,
wherein the parameter negotiating session is established based on the device transmitting the information to the client device.

14. The device of claim 8, wherein the one or more processors are further to:
categorize the first parameter as a periodic parameter based on the second request indicating that the device is to periodically provide information indicating the value of the first parameter; and categorize the second parameter as a non-periodic parameter based on the second request indicating that the device is to provide information indicating the updated value of the second parameter when the current value of the second parameter changes.

15. A system comprising:
a client device configured to:
identify a first parameter that is to be updated periodically;
identify a second parameter that is to be updated based on a state change associated with the second parameter;
transmit a first request for establishing a parameter negotiation session to a server device via a first communication protocol,
wherein a body of the first request is defined utilizing a protocol buffer message, and
wherein the parameter negotiation session is established based on the first request;
transmit, via the parameter negotiation session and using the first communication protocol, a second request to the server device,
wherein the second request indicates that the server device is to periodically provide information indicating a current value of the first parameter and that the server device is to provide information indicating an updated value of the second parameter when a state of the second parameter changes, and
wherein the client device utilizes the protocol buffer to format a body of the second request;
periodically receive, from the server device and via a second communication protocol, a first datagram including the current value of the first parameter; and
receive, from the server device and via the second communication protocol, a second datagram including the updated value of the second parameter based on the server device determining that the state of the second parameter has changed.

16. The system of claim 15, wherein the client device, when identifying the second parameter, is configured to:
utilize machine learning to identify the second parameter.

17. The system of claim 15, wherein the client device is further to:
obtain information identifying a plurality of parameters associated with the client device;
identify a first group of parameters, of the plurality of parameters, that are to be updated periodically; and
identify a second group of parameters, of the plurality of parameters, that are to be updated based on a respective state change associated with each parameter included in the second group of parameters,
wherein the first group of parameters includes the first parameter and the second group of parameters includes the second parameter, and
wherein the first parameter is identified based on the first parameter being included in the first group of parameters and the second parameter is identified based on the second parameter being included in the second group of parameters.

18. The system of claim 15, wherein the client device, when identifying the second parameter, is further to:
receive information associated with changes in parameter values for the second parameter; and
process, using a first model, the information associated with changes in parameter values for the second parameter to identify the second parameter as a parameter that is to be updated based on the state change associated with the second parameter.

19. The system of claim 18, wherein the client device is to:
receive information associated with changes in parameter values for a plurality of parameters; and
perform a training operation when generating the first model by portioning the information associated with changes in the parameter values for the plurality of parameters into a training set, a validation set, and a test set,
wherein performing the training operation comprises:
using the training set to fit the first model,
using the validation set to provide an evaluation of a fit of the first model on the training set while tuning the first model, and
using the test set to provide an evaluation of the first model on the training set.

20. The system of claim 15, wherein the client device, when identifying the second parameter, is further to:
determine that a frequency at which a value of the second parameter changes is greater than a threshold frequency; and
identify the second parameter based on the frequency at which the value of the second parameter changes being greater than the threshold frequency.

* * * * *